United States Patent [19]
Henderson

[11] 3,953,583
[45] Apr. 27, 1976

[54] GRIT REMOVAL FROM CARBON BLACK

[75] Inventor: Eulas W. Henderson, Oregon, Ohio

[73] Assignee: Phillips Petroleum Company, Bartlesville, Okla.

[22] Filed: May 28, 1974

[21] Appl. No.: 473,729

[52] U.S. Cl. ............................. 423/450; 23/259.5; 423/456; 423/460; 423/461
[51] Int. Cl.² ......................................... C09C 1/50
[58] Field of Search ........... 423/450, 455, 456, 457, 423/458, 460, 461; 23/259.5

[56] References Cited
UNITED STATES PATENTS

| | | |
|---|---|---|
| 3,009,784 | 11/1961 | Krejci .............................. 423/456 |
| 3,253,890 | 5/1966 | Deland et al. ..................... 423/455 |
| 3,560,164 | 2/1971 | Venable ............................ 23/259.5 |
| 3,677,704 | 7/1972 | Byron ............................... 423/450 |
| 3,701,827 | 10/1972 | Dahmen ............................ 423/456 |

*Primary Examiner*—Edward J. Meros

[57] ABSTRACT

Carbon black is produced in a generally vertically extending reactor in which a feed oil is introduced at the top. Combustion gases are introduced into an upper region of the reactor to supply sufficient heat to decompose the oil to form carbon black. Grit is removed from the carbon black by passing a stream of air upwardly through the carbon black, either in the reactor or in a separate chamber. The reactor can be of such configuration as to cause a reversal in the direction of flow of the carbon black to facilitate grit removal.

3 Claims, 3 Drawing Figures

GRIT REMOVAL FROM CARBON BLACK

It has recently been found that carbon black of relatively large particle size can be produced in a generally vertically extending reactor in which the feed oil is introduced at the top of the reactor. Combustion gases are introduced in the upper region of the reactor to supply sufficient heat to decompose the oil to produce carbon black. However, reactors of this type tend to produce more grit than do other types of carbon black furnaces. The term "grit" is used to refer to carbonaceous or cokelike pieces, and can include pieces of ceramic materials, possibly resulting from abrasion of refractory materials in the reactor. In some commercial operations, pulverizers have been employed to reduce the size of the grit to an acceptable level. However, these devices do not actually remove the grit from the carbon black, with the result that some contamination occurs. Other known procedures for removing grit have employed separators, such as cyclones. However, these procedures require additional equipment downstream of the reactor and thus increase the cost of the plant.

In accordance with this invention, a method is provided for removing grit from carbon black produced in a generally vertically extending reactor. This is accomplished by passing a stream of air upwardly through the carbon black so as to elutriate the carbon black and separate the grit. The grit removal can take place either within the reactor itself or in auxiliary equipment through which a portion of the carbon black is directed before being passed from the reactor into downstream separation equipment. In accordance with another aspect of this invention, apparatus is provided which is particularly adapted for use in producing carbon black and removing grit therefrom.

In the accompanying drawing.

Figure 1:
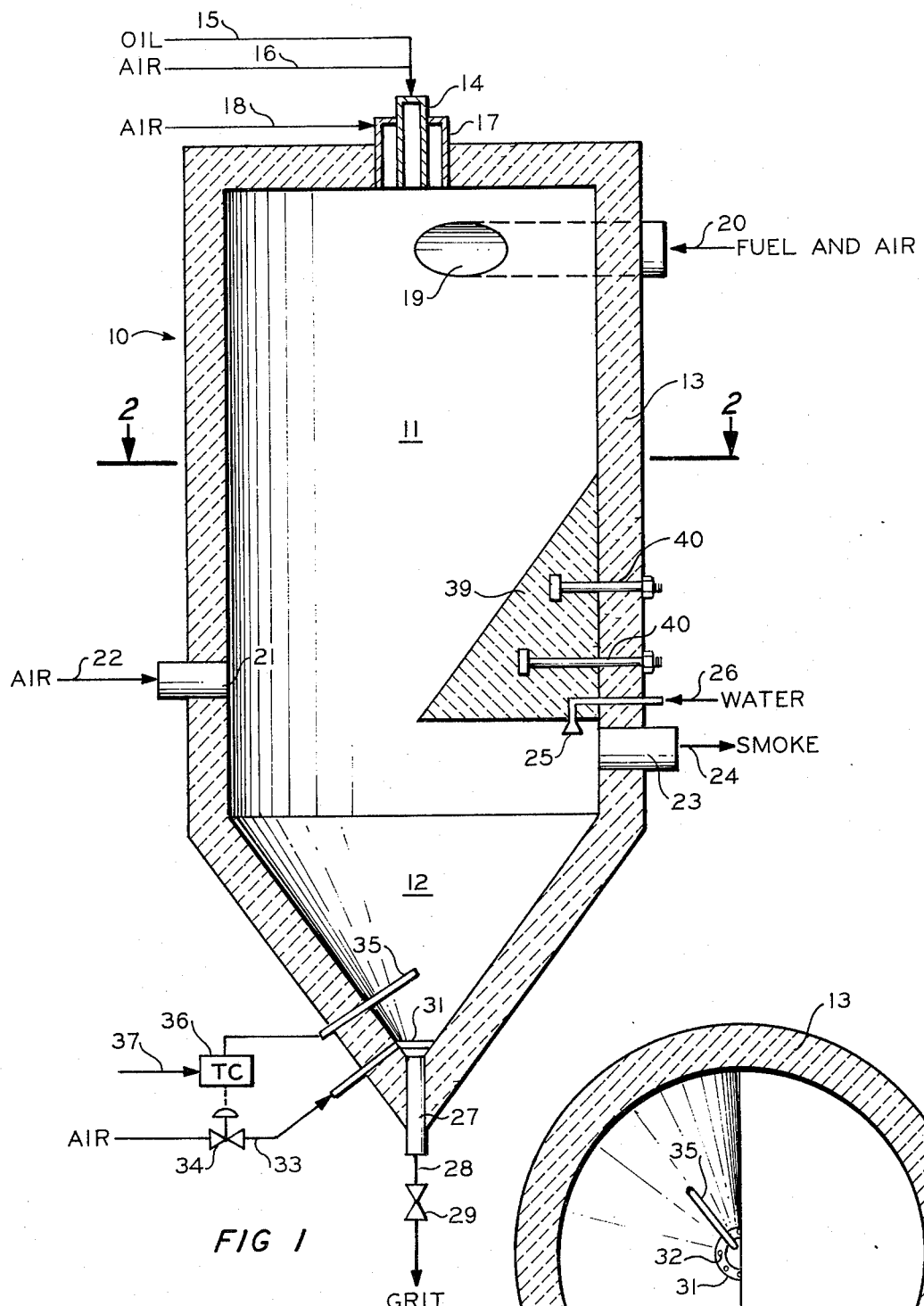
FIG. 1 is a schematic representation of a first embodiment of a carbon black-producing furnace having separation apparatus of this invention incorporated therein.

Referring now to the drawing in detail and to FIG. 1 in particular, there is shown a generally vertically extending carbon black reactor 10. The reactor comprises an upper cylindrical section 11 and a lower conical section 12. These two sections are surrounded by a mass of refractory insulating material 13. In order to simplify the drawing, only a single layer of insulating material is shown. However, in actual practice several layers of refractory are often employed, and a metal shell encloses the outer layer.

A nozzle 14 is positioned in the top of the reactor on its axis. A stream of feed oil 15 and a stream of air 16 are introduced through nozzle 14. While nozzle 14 has been illustrated as a cylindrical tube, the nozzle can be provided with a spray element to disperse the air-oil mixture into the reactor. Additional air supplied by a conduit 18 can be introduced through a tube 17 which surrounds nozzle 14. The air introduced through conduit 16 is referred to hereinafter as "atomizing" air, and the air introduced through conduit 18 is referred to hereinafter as "axial" air. The reactor is provided with one or more inlet ports 19 in the upper region of section 11 through which combustion gases are introduced. These combustion gases can result from the burning of fuel and air which are supplied through a conduit 20. The burning can take place outside the reactor or within the passage leading into the reactor.

One or more inlets 21 are provided in the lower region of section 11 to introduce air from conduit 22. This air, which is often referred to as "secondary" air, is employed to treat the black to decrease the photelometer reading. An outlet port 23 is provided through which the smoke 24 is removed and directed to conventional separation equipment to remove carbon black from the gases. A nozzle 25 is positioned adjacent port 23 to spray quench water 26 into the reactor. An opening 27 is provided in the bottom of conical section 12. A conduit 28, which can have a valve 29 therein, communicates with opening 27 to permit withdrawal of grit.

Figure 2:
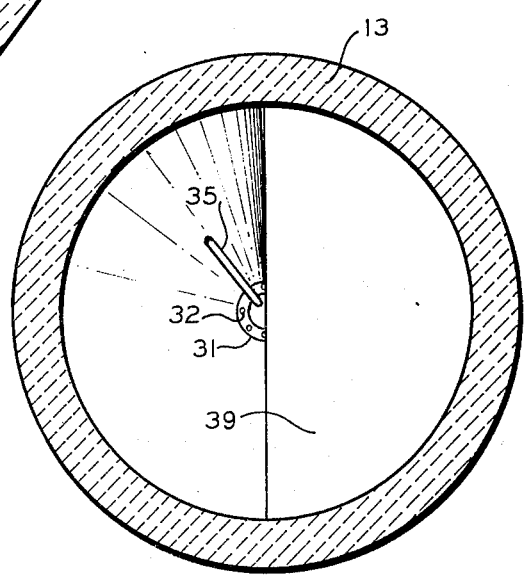
FIG. 2 is a view taken along line 2—2 in FIG. 1.

An air distribution ring 31, which is provided with a series of openings 32, see FIG. 2, is positioned in the lower region of reactor section 12. Air is supplied to ring 31 through a conduit 33 which has a control valve 34 therein. A temperature sensing element 35 extends into conical section 12 to measure the temperature in this section. Element 35 is connected to the input of a temperature controller 36. Controller 36 compares the measured temperature with a reference setpoint signal 37, and adjusts valve 34 in the manner to be described if the measured temperature differs from the reference setpoint temperature.

A ledge of ceramic material 39 is secured to the wall of the reactor, such as by means of bolts 40, to shield outlet port 23 from nozzle 14. In the illustrated embodiment, this ledge can extend approximately one-half the distance across the reactor. The purpose of ledge 39 is to cause the gases containing produced carbon black to flow in a circuitous path from the central zone of the reactor to the outlet, thereby causing heavier grit particles to fall to the bottom of the reactor.

The air introduced through ring 31 elutriates the carbon black and grit and thereby assists in a separating carbon black from the grit. In addition, this air can serve to burn any unburned fuel to increase temperature by a small amount. The heavier grit particles fall into opening 27 and are removed through conduit 28 either continuously or intermittently. The lighter carbon black tends to remain suspended in the gas and is passed through outlet 23 to conventional separation equipment, not shown. The rate of introduction of air through conduit 33 is controlled in response to the measured temperature so as to tend to maintain a predetermined temperature in the lower region of section 12. If the measured temperature should tend to increase above a desired value, such as 2000° F., for example, less air is introduced through conduit 33 to decrease burning. The air introduced through opening 21 tends to modify the properties of the carbon black by partial oxidation of the black, as is known in the art.

Figure 3:
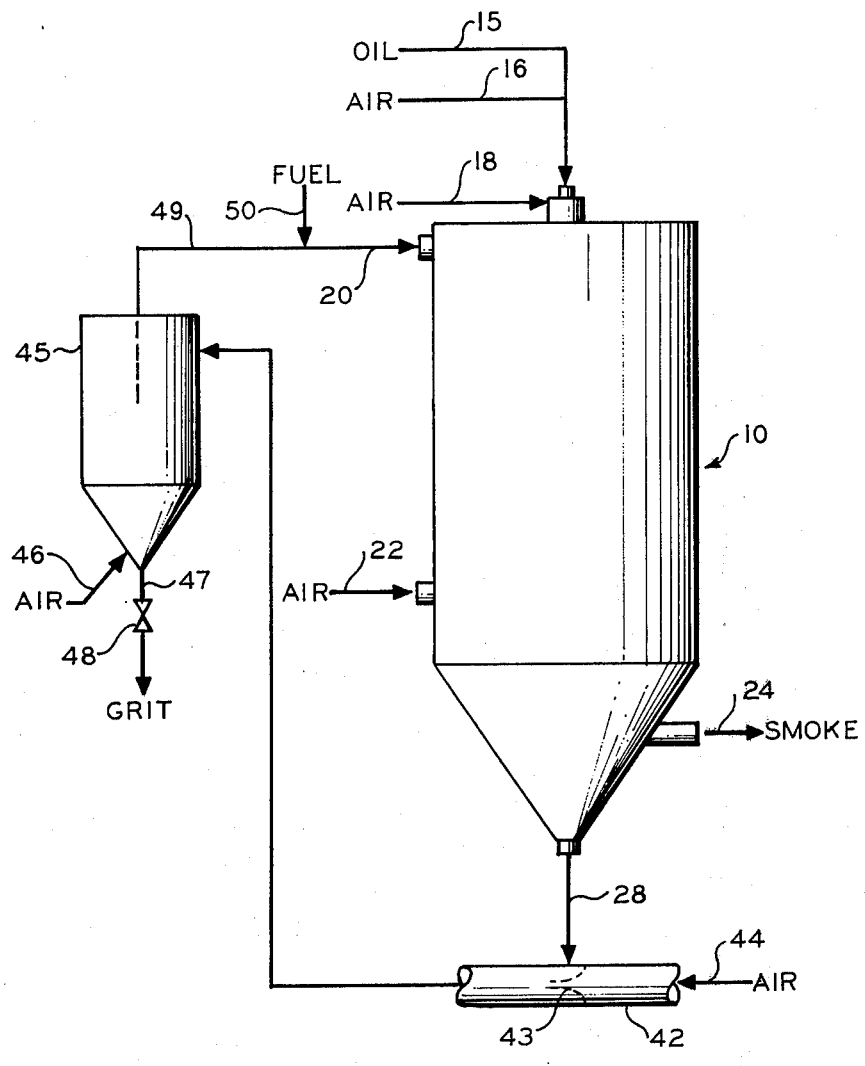
FIG. 3 is a schematic drawing of a second embodiment of the grit removing apparatus of this invention.

A second embodiment of the grit removal apparatus is illustrated in FIG. 3. Reactor 10 corresponds generally to the reactor shown in FIG. 1, and corresponding elements are designated by like reference numerals. The reactor of FIG. 3 need not contain a ledge 39, although such a ledge is useful. In the apparatus of FIG. 3, conduit 28 communicates with a conduit 42 which has a mixing element or aspirator 43 therein. A stream of air is directed through conduit 42 from an air source 44. This air stream carries carbon black and grit removed through conduit 28 into a separator 45 which can be a cyclone separator. A stream of air 46 is introduced into the lower region of the cyclone to assist in separating grit from carbon black and air in the same manner as the air introduced through conduit 33 in FIG. 1. The grit is removed from the bottom of the separator through a conduit 47 which can have a valve 48 therein. Air and carbon black are removed from the top of separator 45 through a conduit 49 which communicates with conduit 20.

In the apparatus of FIG. 3, air is not introduced into the bottom of reactor 10, but instead is introduced into the lower region of the cyclone separator. The air serves basically the same purpose in the cyclone. The stream removed through conduit 28 contains some carbon black in addition to the grit, but this carbon black is recycled back to the reactor through conduit 49. The air introduced through conduit 44 supports combustion of fuel introduced through a conduit 50. If desired, additional air can be introduced through a conduit, not shown, communicating with conduit 49.

The feedstock employed in carrying out this invention can be any hydrocarbon oil conventionally employed in furnace carbon black-producing processes. Suitable oils are described in U.S. Pat. No. 2,865,717 and 3,235,334, for example. The fuel preferably is a light hydrocarbon gas such as natural gas, propane, butane or the like. As an alternative, a liquid fuel can be employed if a suitable atomizing burner is provided. In general, an air to oil ratio in the range of 250–450 standard cubic feet per gallon can be employed. This includes the total amount of air introduced through conduits 16, 18 and 20, but excludes any air introduced through conduit 22. On this same basis, an air to fuel (gaseous) ratio of about 1 to 3 times the stoichiometric ratio is generally preferred.

In a typical carbon black furnace of the type shown in FIG. 1, but not including ledge 39, ring 31 or grit removal conduit 28, the produced carbon black contained about 0.0042 weight percent grit, as measured by ASTM D-1514-60. This carbon black was produced at a rate of about 490 pounds per hour in a furnace having a diameter of 40 inches and a total length of 24 feet. Inlet 19 was located about 10 feet from the top of the reactor, and inlet 21 was located about 11 feet from the top of the reactor. Quench nozzle 25 was located about 20 feet from the top of the reactor. The reactor was supplied with a feed oil at a rate of 93 gallons per hour, and with feed atomizing air at a rate of 4,500 standard cubic feet per hour. Air and natural gas were supplied through inlet 19 at rates of 21,070 and 1,321 standard cubic feet per hour, respectively. Secondary air was supplied through inlet 22 at a rate of 9,310 standard cubic feet per hour. Quench water was supplied at a rate of 20 gallons per hour.

Calculations have shown that the grit can be reduced to about 0.0031 weight percent in a reactor of the type shown in FIG. 1 wherein air is supplied through conduit 33 at a rate of about 1800 standard cubic feet per hour to maintain the temperature sensed by element 35 at about 2000° F. In this operation, the feed rate is about 94 gallons per hour, the atomizing and axial air rates are about 4,600 standard cubic feet per hour each, the tangential air rate through conduit 20 is about 21,350 standard cubic feet per hour, the tangential gas rate is about 1,337 standard cubic feet per hour, the secondary air rate through conduit 22 is about 7,330 standard cubic feet per hour, and the quench water rate is about 20 gallons per hour. The reactor is of the same size as described above, with ledge 39 extending one-half the reactor diameter. Black is produced at a rate of about 496 pounds per hour.

Calculations have also shown that the grit can be reduced to about 0.0021 weight percent in a reactor of the type shown in FIG. 3 (no ledge 39) wherein air is supplied through conduit 46 at a rate of about 1,350 standard cubic feet per hour. In this operation, the quench water rate, the feed, axial air and atomizing air rates are as described above with respect to the reactor of FIG. 1. Air is supplied through conduit 20 at a rate of about 20,000 standard cubic feet per hour, and secondary air is supplied through conduit 22 at a rate of about 9,330 standard cubic feet per hour. Gases flow through conduit 28 at a rate of about 10,000 standard cubic feet per hour. The reactor is the same size as described above, and black is produced at a rate of about 491 pounds per hour.

While this invention has been described in conjunction with a presently preferred embodiment, it should be evident that it is not limited thereto.

What is claimed is:

1. In the production of carbon black in a generally vertically extending reactor in which a feed oil is introduced into the top of the reactor and flows downwardly, and combustion gases are introduced into an upper region of the reactor to supply heat to the oil to decompose the oil to form carbon black; the method of removing grit from the carbon black which comprises introducing a stream of air into a lower region of the reactor in an upwardly extending direction to entrain carbon black while permitting the grit to pass downwardly, removing the downwardly passing grit through a first opening in the bottom of the reactor, and removing combustion gases and carbon black through a second opening in the reactor spaced upwardly from said first opening.

2. The method of claim 1, further comprising measuring the temperature within the lower region of the reactor, and controlling the rate at which the stream of air is introduced into the reactor in response to the measured temperature so as to maintain the measured temperature at a preselected value.

3. The method of claim 1 wherein the combustion gases and carbon black are passed in a circuitous path from the central zone of the reactor to said second opening so that grit tends to fall by gravity to said first opening.

* * * * *